Nov. 10, 1959 G. A. LYON 2,912,281
WHEEL COVER
Filed March 30, 1956 2 Sheets-Sheet 2
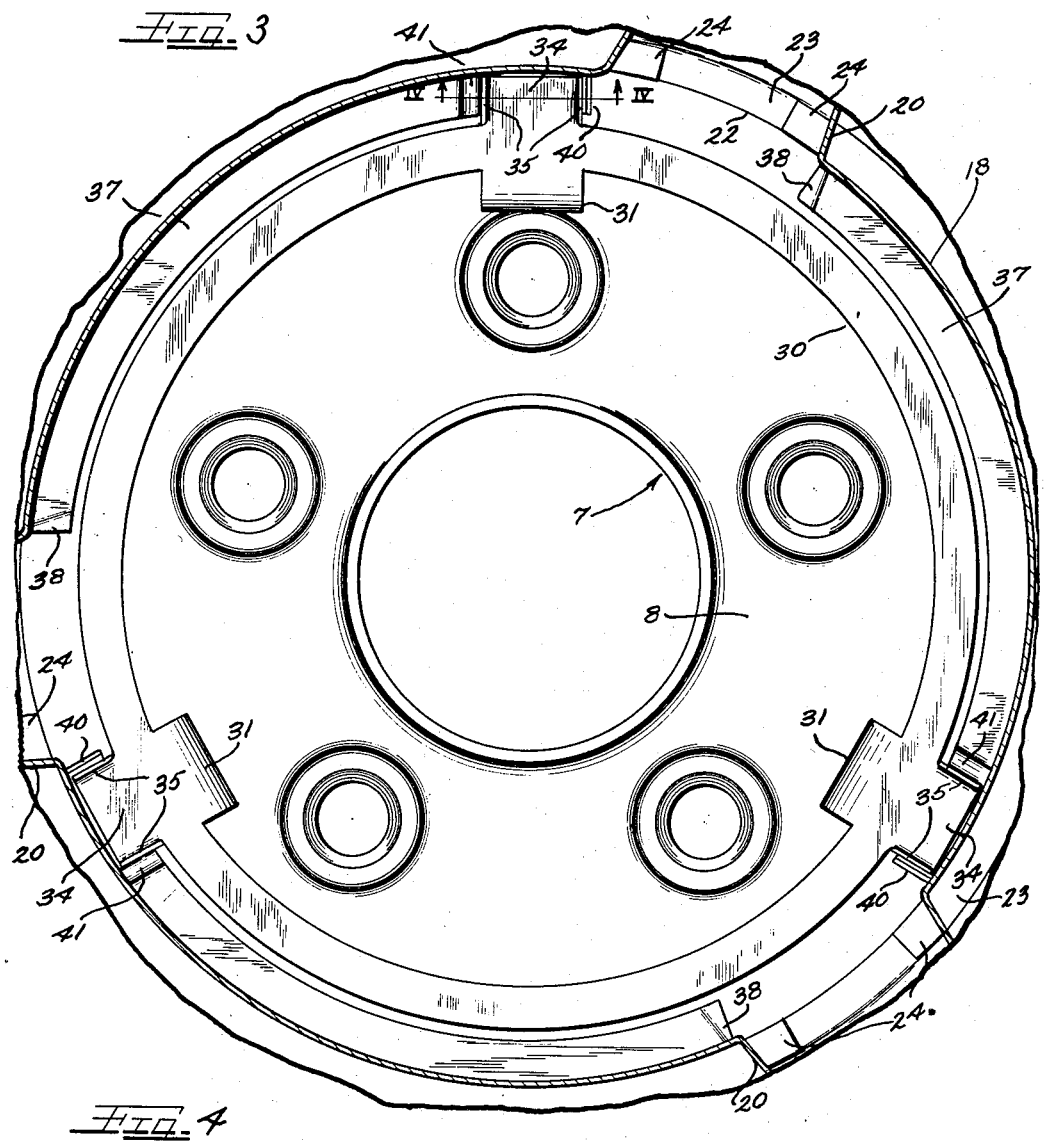
Fig. 3
Fig. 4
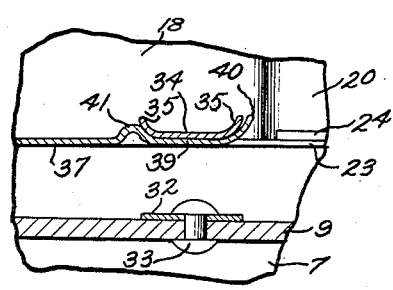
Inventor
GEORGE ALBERT LYON United States Patent Office 2,912,281
Patented Nov. 10, 1959

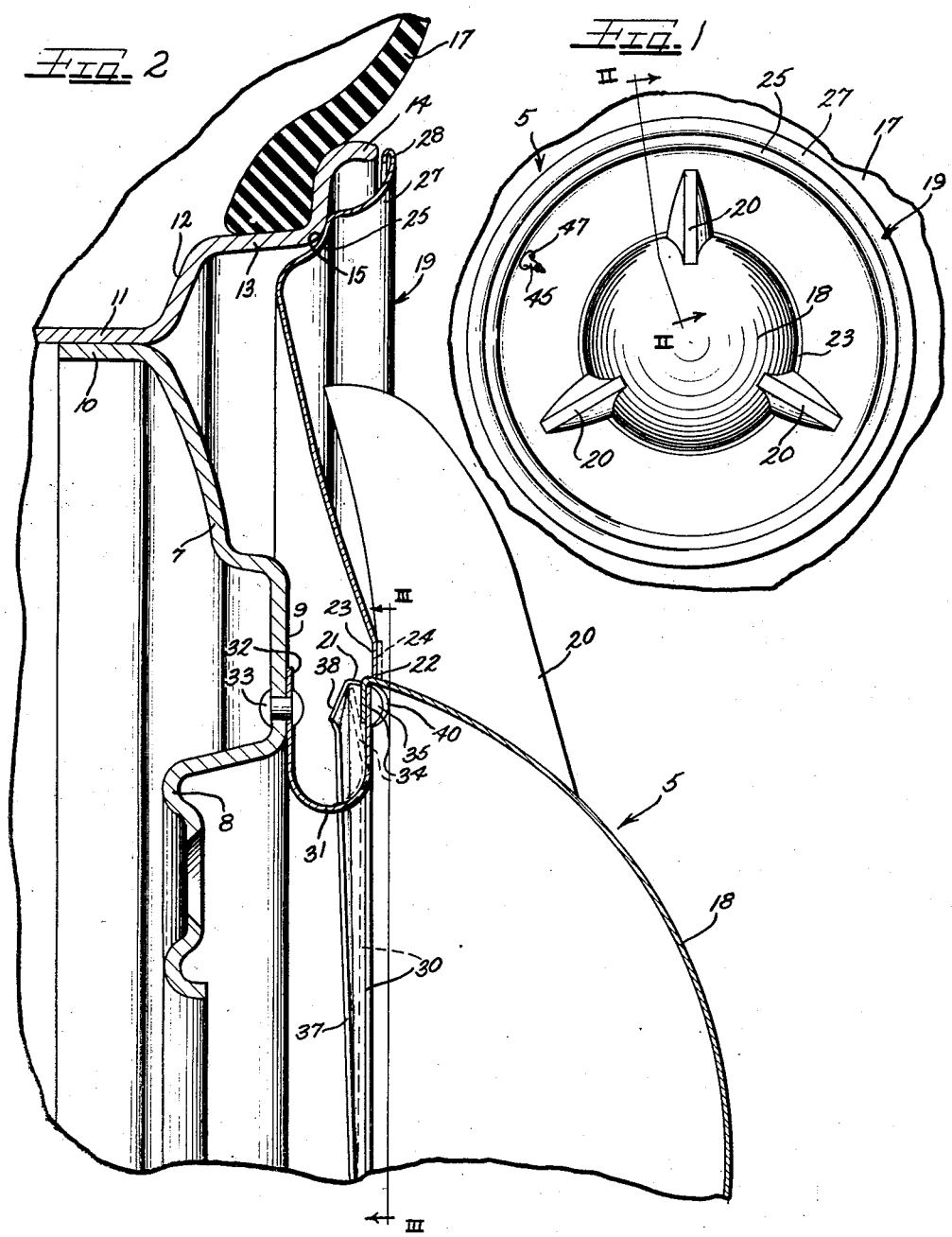

2,912,281

WHEEL COVER

George Albert Lyon, Detroit, Mich.

Application March 30, 1956, Serial No. 575,094

12 Claims. (Cl. 301—37)

The present invention relates to improvements in wheel structures and more particularly concerns the ornamental and protective covering of the outer sides of vehicle wheels.

An important object of the present invention is to provide a wheel structure having novel cover structure for disposition at the outer side of the wheel and improved means for retaining the cover on the wheel.

Another object of the invention is to provide an improved wheel structure including a cover arranged to be applied to the outer side of the wheel by turning of a central portion of the cover into retaining engagement with resilient retaining means on the wheel.

A further object of the invention is to provide improved cover retaining means for wheel structures.

It is a further object of the invention to provide a resilient spring ring device engageable retainingly with a rotatable cover for resilient tensioned retention of the cover on a wheel.

Other objects, features and advantages of the present invention will be readily apparent from the following detailed description of a preferred embodiment thereof taken in conjunction with the accompanying drawings in which:

Figure 1 is an outer side elevational view of a wheel structure embodying features of the invention;

Figure 2 is an enlarged fragmentary generally radial view taken substantially on the line II—II of Figure 1 and showing various details of structure;

Figure 3 is a fragmentary sectional elevational view taken substantially along the line III—III of Figure 2; and Figure 4 is a fragmentary sectional detail view taken substantially on the line IV—IV of Figure 3.

According to the present invention a wheel cover 5 is arranged to be applied to the outer side of a vehicle wheel including a disk spider wheel body 7 having a central dished bolt-on flange 8 and an annular outwardly bulged nose portion 9 intermediate the wheel body bolt-on flange and the radially outer portion of the body which includes an axially inwardly directed attachment flange 10. Attached to the attachment flange is a base flange 11 on a tire rim that includes an outer side flange 12, an intermediate flange 13 and a terminal flange 14 joined on a juncture shoulder 15 to the intermediate flange. A pneumatic tire such as a tubeless tire 17 is adapted to be supported by the multi-flange drop center tire rim.

The wheel cover 5 is preferably constructed in two parts, including a central crown portion 18 of outwardly convex domed structure, and a circular ring portion 19 formed separately but arranged in assembly to co-operate with the central dome or cap member 18 to provide a complete cover that extends entirely over the outer side of the wheel.

For ornamental purposes and also to provide handles by which the central dome cover member 18 is adapted to be turned, the latter is provided with a series such as three generally radially projecting hollow shell ears 20 which are preferably formed integrally in one piece with the central cover member. For this purpose, the cover member 18 is preferably formed as a sheet metal stamping from suitable sheet material such as stainless steel, brass, aluminum or the like.

For centered engagement of the crown or cap member 18 of the cover with the ring cover portion or member 19 of the cover assembly, generally axially inwardly projecting flange portions 21 are provided on the margin of the central cover 18 and projecting axially inwardly beyond the adjacent radially inner portions of the axially inner side wall edges defining the handle ears 20 so as to fit freely within a central opening 22 in the cover member 19, the diameter of which opening is just slightly greater than the outside diameter of the flanges 21. Defining the opening 22 is an axially outwardly facing marginal flange 23 which is engageable slidably by underturned abutment shoulder flanges 24 on the inner extremity portions of the margins defining the side wall edges of the handle ears 20.

From the inner marginal flange 23, the cover member 19 extends generally radially outwardly and axially inwardly for overlying the wheel body 7 and joins adjacent its outer margin a turned annular reinforcing and shoulder rib 25 that is arranged to seat against the rim shoulder 15 for defining the axially inward disposition of the cover assembly on the wheel and also extends about the shoulder 15 for centering the cover member 19 relative to the wheel. Radially outwardly from the shoulder 25, the cover member 19 has a marginal extremity annular rib-like portion 27 which is arranged to overelie the terminal flange 14 and has a turned reinforcing and finishing bead flange 28. Behind the marginal extremity rib 27 is a chamber within which wheel balancing weights are arranged to be accommodated in concealed relation.

For retaining the cover assembly 5 on the outer side of the wheel, resilient spring retaining structure is provided on the wheel engageable by retaining means on the cover assembly and more particularly upon the central crown portion 18 thereof. To this end, a spring cover retainer 30 is provided in the form of a continuous flat ring of a diameter to overlie the wheel body 7 adjacent to the radially inner portion of the nose bulge 9 but in spaced relation thereto. Connecting the ring 30 to the wheel body is a series of return bent open spring loop legs 31 which are symmetrically circumferentially spaced and may comprise any suitable number such as three and have generally radially outwardly extending base portions 32 that are secured as by means of respective rivets 33 to the radially inner portion of the crown of the nose bulge 9 substantially as shown in Fig. 2.

At its radially outer edge, the ring member 30 which overlies the spring base portions 32, is of a diameter to fit in substantially radially inwardly spaced relation concentrically within the cover crown flange 21. Moreover, in its normal position, the ring member 30 is adapted to be disposed closer to the wheel body 7 and more particularly the nose bulge 9 thereof, as shown in dash outline, than in cover retaining relation as shown in full outline in Fig. 2 and wherein the retaining legs 31 are spread to a more open position and substantially tensioned.

For retaining engagement with the cover, the retaining spring ring 30 is provided with a plurality such as three generally radially outwardly projecting retaining flange projections 34 of substantial stiffness provided with turned up reinforcing side flanges 35 and of a maximum radially outward extent to be received freely but closely within the central cover marginal flange 21.

Engageable retainingly with the flange extensions 34 are cam flanges 37 on the extremity of the central cover flanges 21, turned generally radially inwardly and symmetrically generally spirally disposed and extending between the respective adjacent sides of the ear projections 20. It will be understood, of course, that each of the flanges 37 slopes identically with respect to the other flanges 37, so that at one end each of the flanges 37 is disposed substantially axially inwardly relative to the opposite end of the flange. Between the axially innermost end of one of the flanges 37 and the axially outermost end of the immediately adjacent flange 37 is a gap through which one of the retaining flange extensions 34 is adapted to clear in assembling the central cover member 18 relative to the retaining flange ring 30. Since the number of retaining flange extensions 34 equals the number of gaps between the flanges 37, all of the retaining flanges 34 will be cleared simultaneously. Then, by turning the axially innermost ends of the retaining flanges 37 on the cover member toward the retaining ring flange extensions 34, generally axially inwardly turned respective lead-in cam ramp terminals 38 on the axially inner end portions of the retaining flanges 37 will engage behind the associated retaining ring flange extension 34. Continued turning of the central cover member works the spiral retaining flanges 37 around until the spring loops are expanded and tensioned open and the retaining ring flange extensions 34 engage within retaining socket or seat pocket portions 39 on the axially outermost end portions of the retaining flanges 37, defined by respective turned up stop end extremities 40 and respective turned up shoulder crimp or humped undulations 41 spaced sufficiently from the turned up end or extremity 40 to cradle the engaged retaining ring flange extension 34 interlockingly in the interlock pocket 39 (Fig. 4). The spring loops or legs 31 and the extensions 34 could be parts of individual springs but by forming them as aligned parts of the ring 30 greater stability and uniformity in operation are attained.

In applying the cover assembly 5 to the outer side of the wheel, a valve stem 45 is registered through a valve stem aperture 47 in the outer annular cover member 19, and the seating shoulder 25 of the cover member 19 is engaged with the tire rim shoulder 15. In this relationship, the central cover member 18 is maintained, by seating of the outer cover member 19 against the tire rim, in predetermined spaced relation to the wheel body and more particularly the nose bulge 9. In such relationship of the inner cover member 18, with the sliding seating flanges 24 engaging the inner marginal cover flange 23, the lead-in cam ramps 38 are disposed for engaging behind the retaining ring extensions 34 which are in their normally axially inward disposition as shown in dash outline in Fig. 2 to which they are drawn by the contracted normal condition of the retaining spring loop legs 31. Turning of the cover member 18 as by manipulation of the handle ears 20, in counterclockwise direction as viewed in Figs. 1 and 3, causes the retaining ring extensions 34 to ride up the inclines of the retaining flanges 37 and thus gradually places the entire cover assembly under resilient tension as the spring legs 31 are tensioned. Such spring tension reaches its maximum when the retaining ring extensions 34 snap past the retaining shoulder humps 41 into the interlock seats 39. Under such spring tension the cover assembly is held firmly against the wheel at the cover shoulder 25. Furthermore, the central cover member 18 is held firmly against turning out of the interlocked relation of the retaining ring extensions 34 within the seats 39. However, when it is desired to release the cover from the wheel, rotary effort applied to the central cover member 18 in a clockwise direction as seen in Figs. 1 and 3 will cause the retaining spring legs 31 to yield sufficiently to enable snapping of the retaining ring extensions 34 from the retaining seats or cradles 39 over the humps 41 and then final release of the cover by turning of the central cover member until the cam flanges 37 have cleared the retaining ring extensions 34.

It will be understood that modifications and variations may be effected without departing from the scope of the novel concepts of the present invention.

I claim as my invention:

1. In a wheel structure including a tire rim having an annular shoulder thereon and a wheel body supporting the rim and having an intermediate axially outwardly facing annular portion, a retaining ring member having resilient loop legs secured to said annular wheel body portion and having a ring portion spaced from said body portion with generally radial projections from said ring, said ring portion being generally axially flexible relative to the wheel by resilient flexing of said loop legs, and a cover for disposition at the outer side of the wheel including a shouldered portion engageable with the rim shoulder for determining the axial disposition of the cover and a central portion engageable retainingly with said ring projections for drawing said ring axially outwardly under resilient tension of said spring loop legs for thereby reacting to draw the cover toward the wheel and said shoulder portion firmly toward the rim shoulder.

2. In a wheel structure including a tire rim having an annular shoulder thereon and a wheel body supporting the rim and having an intermediate axially outwardly facing annular portion, a retaining ring member having resilient loop legs secured to said annular wheel body portion and having a ring portion spaced from said body portion with generally radial projections from said ring, and a cover for disposition at the outer side of the wheel including a shouldered portion engageable with the rim shoulder for determining the axial disposition of the cover and a central portion engageable retainingly under resilient tension of said spring loop legs with said ring projections, said central cover portion including a domed member having handle projections thereon and cam flanges engageable with said ring projections incident to turning of the central cover portion by means of said handle projections.

3. In a wheel structure including tire rim and body parts, a wheel cover including circular radially inner and radially outer parts, said radially inner part having generally radially inwardly extending cover retaining flange structure thereon and being rotatable relative to the radially outer part, and cover retaining means including axially resiliently flexible structure mounted on the wheel body and retainingly engageable and drawn generally axially outwardly into resiliently tensioned relation by said inner cover part flange structure by rotation of the latter and thereby reacting to draw the cover toward the wheel.

4. In a wheel structure including tire rim and body parts, the body part having thereon a cover retaining ring axially movable and with spring loops secured to the body part and cover retaining projections from the ring, a cover for disposition at the outer side of the wheel including an annular outer cover member engageable with the tire rim and a rotary inner cover member having flanges thereon behind the cover retainingly engageable with said projections by turning of the inner cover member and thereby placing the spring loops under tension and drawing the retaining ring resiliently deflectably axially outwardly to place the same under axially inward pulling tension.

5. In a wheel structure including a tire rim and a wheel structure including a tire rim and a wheel body, a cover assembly including a central domed cover member and a cover annulus engageable with the tire rim, the domed cover member having an axial flange structure engageable within the inner periphery of the annular cover member, said flange structure including generally radially inwardly directed spiral cam flange sections, and means for retaining the cover on the wheel including an axially movable ring member having resilient spring connection with the wheel body and projections thereon retainingly engageable with said spiral cam flanges incident to turning of the central cover member relative to the annular cover member to thereby draw the ring member generally axially outwardly and place the spring connection under resilient tension to thereby draw the cover toward the wheel.

6. In a wheel structure including a wheel body, a cover retaining ring member having radially inner and outer edges and arranged to overlie the wheel body in spaced relation, said ring member having projecting from one margin underturned resilient spring legs normally in a contracted position wherein the ring member is supported in predetermined drawn in spaced relation to the wheel body and adapted to be resiliently flexed to permit the ring member to be drawn axially away from the wheel body by a cover member incident to attachment of the cover to the wheel by means of the ring member, and portions on the ring member at the opposite margin thereof engageable by retaining means on a cover.

7. In a wheel structure including a wheel body, a cover retaining ring member having radially inner and outer edges and arranged to overlie the wheel body in spaced relation, said ring member having projecting from one margin underturned resilient spring legs normally in a contracted position wherein the ring member is supported in predetermined drawn in spaced relation to the wheel body and adapted to be resiliently flexed to permit the ring member to be drawn axially away from the wheel body by a cover member incident to attachment of the cover to the wheel by means of the ring member, and portions on the ring member at the opposite margin thereof engageable by retaining means on a cover, said portions comprising radial projections having turned up side margins.

8. In a wheel structure including a wheel body having thereon an annularly spaced series of generally return bent and radially outwardly opening loop cover retaining spring members, means connecting a leg of each member to the wheel body and with generally radially outwardly directed lug flange portions aligned with the remaining leg of each member and generally axially adjustably movable as permitted by resilient flexing of the spring members, and a cover for disposition at the outer side of the wheel and having means retainingly engageable with said lug flange portions for drawing of the cover toward the wheel by the resilient flexible tension of the spring members.

9. In a wheel structure including tire rim and body parts, a cover retaining ring resiliently mounted on one of said parts for generally axial resilient flexible movement and having cover engaging projections, a cover for disposition at the outer side of the wheel including a portion engageable with the wheel for fixed axial disposition of the cover, and means on the cover retainingly engageable with said projections and acting to draw the ring axially outwardly relative to the wheel and thereby to draw the cover firmly toward the wheel for positive engagement of said cover portion with the wheel as a result of resilient tensioning of the ring, the cover including a rotary portion with means thereon engageable with said projections incident to rotation of the rotary portion.

10. In a wheel structure, a wheel member having thereon a cover retaining resiliently mounted ring member including spring loop legs attached to the wheel member and cover retaining projections, said cover retaining projections and legs being disposed on opposite margins of the ring, and the ring being generally axially resiliently deflectably movable relative to the wheel member as enabled by the spring loop means and thereby affording generally axial swinging adjustment movement of the projections relative to the wheel.

11. In a wheel structure including tire rim and body parts, a cover retaining ring having resiliently flexible supporting means thereon extending axially inwardly therefrom and mounted on one of said parts to support the ring in a normally axially outwardly spaced relation to said wheel part for generally axial resilient flexible movement of the ring as permitted by said supporting means, said ring having cover engaging projections, a cover for disposition at the outer side of the wheel including a portion engageable with the wheel for fixed axial disposition of the cover, and means on the cover retainingly engageable with said projections and acting to draw the ring axially outwardly beyond said normally axially outwardly spaced relation by flexing of said supporting means relative to the wheel and thereby placing said supporting means under tension to act through the ring to draw the cover firmly toward the wheel for positive engagement of said cover portion with the wheel as a result of said tension, said means on the cover comprising a circular portion having a peripheral generally axially inwardly extending flange structure with a radially inwardly turned circumferential series of spiral cam attachment flange projections which are engageable with the projections on the cover retaining ring.

12. In a wheel structure including tire rim and body parts, a cover retaining ring having resiliently flexible supporting means thereon extending axially inwardly therefrom and mounted on one of said parts to support the ring in a normally axially outwardly spaced relation to said wheel part for generally axial resilient flexible movement of the ring as permitted by said supporting means, said ring having cover engaging projections, a cover for disposition at the outer side of the wheel including a portion engageable with the wheel for fixed axial disposition of the cover, and means on the cover retainingly engageable with said projections and acting to draw the ring axially outwardly beyond said normally axially outwardly spaced relation by flexing of said supporting means relative to the wheel and thereby placing said supporting means under tension to act through the ring to draw the cover firmly toward the wheel for positive engagement of said cover portion with the wheel as a result of said tension, said means on the cover comprising a circular portion having a peripheral generally axially inwardly extending flange structure with a radially inwardly turned circumferential series of spiral cam flanges which are engageable with the projections on the ring, said circular cover portion being rotatable and having manually engageable generally radially projecting ear members thereon for convenience in turning the cover member.

References Cited in the file of this patent

UNITED STATES PATENTS

| 2,159,881 | Booth | May 23, 1939 |
| 2,166,695 | Van Halteren | July 18, 1939 |
| 2,298,669 | Wood | Oct. 13, 1942 |
| 2,397,360 | Lyon | Mar. 26, 1946 |
| 2,680,551 | Brosky | June 8, 1954 |

FOREIGN PATENTS

| 265,448 | Italy | Aug. 14, 1929 |
| 421,260 | Italy | Mar. 20, 1949 |